Patented May 10, 1932

1,857,596

UNITED STATES PATENT OFFICE

MICHAEL LEVIN, OF BROOKLYN, NEW YORK, ASSIGNOR OF ONE-FOURTH TO JACOB T. BASSECHES, OF NEW YORK, N. Y.

PROTEIN COMPOSITION

No Drawing. Original application filed September 15, 1927, Serial No. 219,820. Divided and this application filed May 2, 1928. Serial No. 274,682.

This invention relates to protein compounds, particularly protein compounds including extending agents. My invention particularly relates to protein compounds such as glue containing extending agents to maintain the protein compounds gelatinous and soft throughout continued periods of use. Still more particularly, my invention relates to gelatinous protein compounds and compositions including such compounds to maintain the same against deterioration or hardening for indefinite periods.

Where I have attempted to modify protein compounds, such as glue, in gelatinous form, by the addition thereto of glycerine, for certain purposes I have found that this material is not only expensive but fails for want of sufficient body. Where I have attempted to retain the gelatinous property of protein compounds by the addition of hygroscopic agents, such as calcium chloride, this extending agent is subject to be displaced and leached from the protein material containing the same, particularly when in contact with aqueous fluids. Furthermore, inorganic agents are objectionable by reason of their corrosive effect when used in contact with certain metals.

I have found that I may extend and maintain supple gelatinous protein compositions, such as glue, casein, albumen, blood or the like by including therewith sodium lactate and/or compounds, organic mixtures including lactic acid, having hygroscopic properties, such as hydrol, the product hereinbelow described.

My invention, therefore, has as an object thereof the provision of protein compositions including an extending agent having hygroscopic properties which will add novel characteristics to the protein material mixed therewith, which will displace, wholly or in part, organic and inorganic extending agents for protein; my invention more particularly has for its object the provision of protein compositions including new and novel extending agents effecting economy of production and facility of displacement in present industrial uses of protein compositions.

For the practice of my invention in connection with protein compositions, such as glue, as one example thereof, I may form an adhesive binder and cork composition.

*Example No. 1*

28 parts gelatine or glue
18 parts glycerine
40 parts water
26 parts sodium lactate The gelatine or glue may be dissolved in the water content in the usual way, whereupon the glycerine and sodium lactate are added. Preferably, the sodium lactate and glycerine are mixed with each other, intimately ground with the protein component and then dissolved in water. The glue may be varied within wide limits of proportions according to the rigidity desired to be imparted to the adhesive composition and the glycerine may also be entirely displaced by the sodium lactate solution. This adhesive may be used as a binder for cork particles to unite the same and mold them into sheets, plates or blocks. The products so made will have all the desirable characteristics resulting from the use of a glycerine extended gelatine but, additionally, will have augmented binding power resulting from the addition thereto of the lactate compound. The cork will be found to be supple and soft and adhere tenaciously to the binder, particularly where disks thereof are used to unite the same to metal caps.

For the production of printers' rolls, a suitable composition, wholly free from glycerine, may be made as follows:

*Example No. 2*

1 part glue
1-2 parts sodium lactate

Here again the sodium lactate may be varied within a wide range of proportions in accordance with the physical characteristics desired to be imparted to the glue wherein the decrease of the sodium lactate content will give a more flexible product.

Where I have previously described the addition of sodium lactate or lactates generally to proteins, I have found that there is commercially available an inexpensive ingredient comprising what may perhaps be the desirable lactate component resulting as a by-product from the conversion process of starch to sugar. Such a material is designated on the market as hydrol. This material contains dextrose, dextrin and maltose, among other carbohydrates, and where sugar is produced from starch by hydrolysis, the mother liquor is obtained in concentrations of 42° to 52° Baumé. In addition to the ingredients specified, the mother liquor may contain nitrogenous decomposition products such as lactic acid, propionic acid, valeric acid and the like. This material has the property of augmenting the adhesive quality of proteins, such as glue, and satisfies all the requirements of glycerine by reason of its hygroscopic nature. It is further superior to glycerine in that it gives greater body to the compound with which it is mixed. An example useful in preparing a cork composition is as follows:

Example No. 3

28 pounds gelatine or glue
40 pounds water
17½ pounds glycerine
10–20 pounds hydrol In this example also, the glycerine may be entirely displaced by hydrol. This mixture may be made as previously described in connection with the preparation of a sodium lactate compound for making the cork composition or as a binder for cork disks or otherwise adhering cork articles to metal.

Example No. 4

28 pounds gelatine or glue
40 pounds water
17½ pounds glycerine
10–20 pounds sodium lactate In this example, also, the glycerine may be entirely displaced by hydrol.

For the production of the printers' roll composition, the hydrol may be substituted in amounts above specified in connection with sodium lactate.

In the claims, where I refer to hydrol by the designation "the mother liquor resulting from the production of sugar by the hydrolysis of starch, obtained in substantially concentrations of 42 to 52° Baumé" I intend to refer to this material by way of description thereof and not by limitations of proportions or concentrations.

This application is a divisional application of my application filed September 15, 1927, Serial No. 219,820, patented June 26, 1928, No. 1,675,181.

Having thus described my invention and illustrated its use, what I claim as new and desire to secure by Letters Patent is—

1. An adhesive composition comprising a protein and a salt of a lactate as an extending agent.

2. As a new composition of matter, inert particles having intimately mixed therewith an adhesive bond comprising glue and sodium lactate as an extending agent.

3. As a new composition of matter, pulverized cork adhesively bound by a binder comprising glue and sodium lactate as an extending agent.

4. As a new composition of matter, a protein, sodium lactate as an extending agent, glycerine and water.

5. An adhesive binder composition comprising glue, glycerine, sodium lactate as an extending agent and water.

6. An adhesive binder composition comprising 28 pounds of glue, 40 pounds of water, 17½ pounds of glycerine and 10 to 20 pounds of sodium lactate as an extending agent.

7. An extending composition for proteins comprising a lactate and the mother liquor resulting from the production of sugar by the hydrolysis of starch obtained in substantially concentrations of 42° to 52° Baumé.

8. An extending composition for a protein comprising sodium lactate and the mother liquor resulting from the production of sugar by the hydrolysis of starch obtained in substantially concentrations of 42° to 52° Baumé.

9. As a new composition of matter, a mixture comprising a protein, the mother liquor resulting from the production of sugar by the hydrolysis of starch obtained in substantially concentrations of 42° to 52° Baumé and sodium lactate.

10. As a new composition of matter, a mixture comprising a protein, the mother liquor resulting from the production of sugar by the hydrolysis of starch, obtained in substantially concentrations of 42° to 52° Baumé and a lactate.

In witness whereof I have signed this specification this 1st day of May, 1928.

MICHAEL LEVIN.